June 19, 1956 H. BREUER 2,751,432

RUB-OUT CORRECTION FOR LINE CASTING TAPE PRODUCTION TRANSMISSION

Filed May 3, 1952 2 Sheets-Sheet 1

INVENTOR.
HENRY BREUER

BY Frederic P. Warfield
ATTORNEY

June 19, 1956 H. BREUER 2,751,432

RUB-OUT CORRECTION FOR LINE CASTING TAPE PRODUCTION TRANSMISSION

Filed May 3, 1952 2 Sheets-Sheet 2

INVENTOR
HENRY BREUER
BY
Frederic P. Warfield
ATTORNEY

United States Patent Office 2,751,432
Patented June 19, 1956

2,751,432

RUB-OUT CORRECTION FOR LINE CASTING TAPE PRODUCTION TRANSMISSION

Henry Breuer, New Fairfield, Conn., assignor to Tape Production Corporation, New York, N. Y., a corporation of Florida Application May 3, 1952, Serial No. 285,990

2 Claims. (Cl. 178—17)

This invention relates to the production of tape for transmission of code combinations perforated in a paper tape.

The object of the invention is the provision of means whereby errors in the tape prepared for transmission, indicated by a line of punches extending transversely the width of the tape and along the tape to the extent necessary to cover the erroneous matter, commonly known as a "rub-out," instead of being transmitted to the receiving instrument in the distant publication plant, may be easily and automatically eliminated from the tape during the transmission. This eliminates time and expense at the transmitting end and very considerable time and expense at the receiving end, as will be understood by those familiar with this art.

Other objects of the invention will in part be obvious and will in part appear hereinafter.

This invention, accordingly, comprises the features of construction, combinations of elements and arrangement of parts, which will be exemplified in the constructions hereinafter set forth, and the scope of the application of which will be indicated in the claims.

For a fuller understanding of the nature and objects of the invention, reference should be had to the following detailed description taken in connection with the accompanying drawings, in which.

Figures 1, 2, 3, 4:
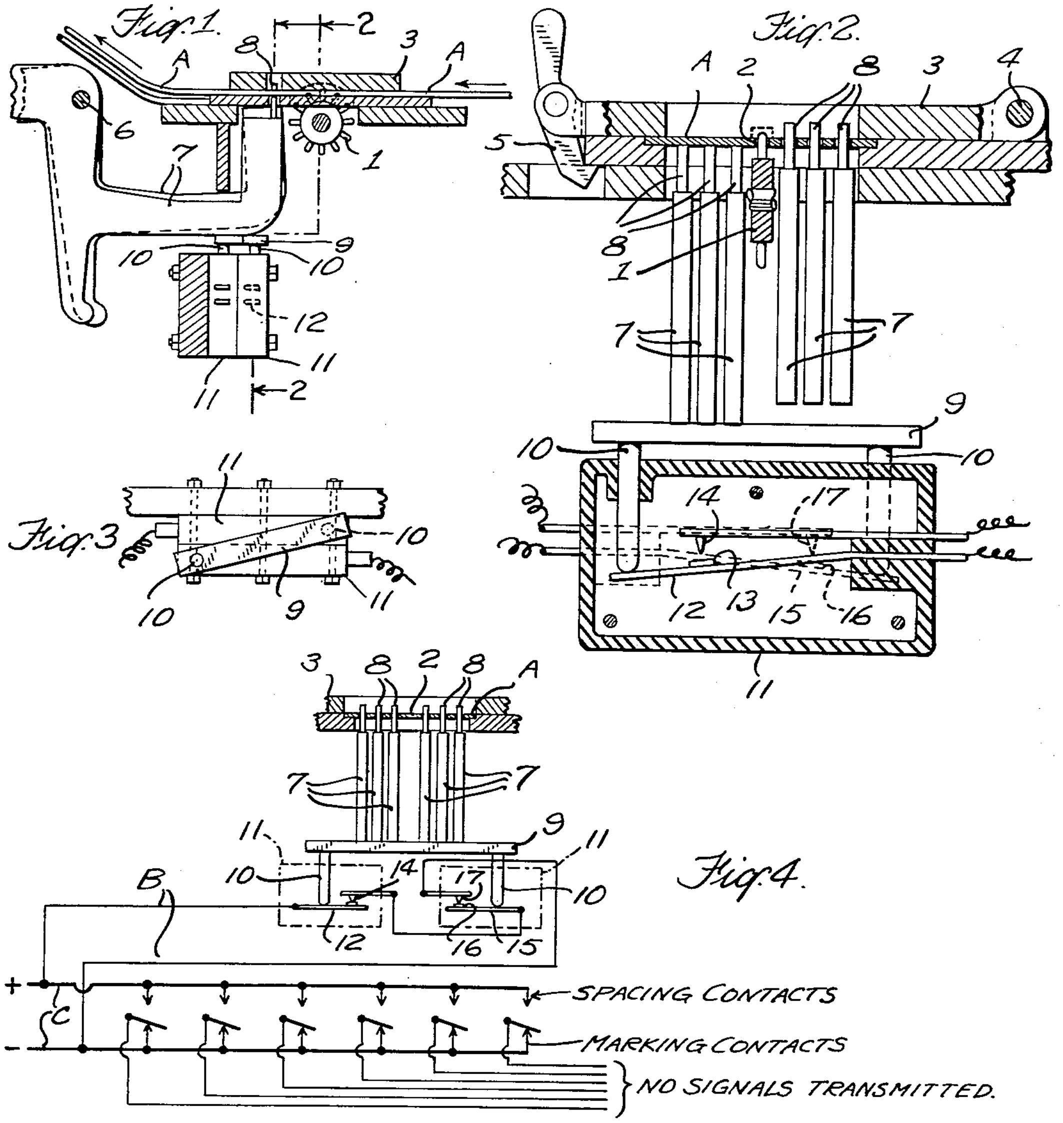
Figure 1 is a detail partly in section showing a tape passing through a transmitting machine of well known type, with my improvement added thereto.
Figure 2 is a section on the lines 2—2 of Figure 1 showing also the details of a switch mechanism which I am using in carrying out the principle of this invention.
Figure 3 shows a detail of the switch mechanism of Figure 2.
Figure 4 shows the main line circuit of the transmitter and the short circuit which is effected by the action of the switch shown, when it is necessary to eliminate a rub-out section of the tape.
Figure 5:
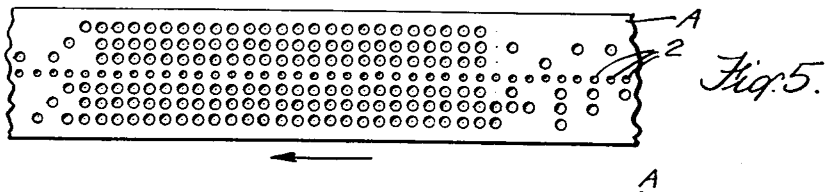
Figure 5 shows a tape wherein the operator made an extended series of errors and indicated a rub-out therefor, this occupying a major section of the center of the tape as shown.

The instrument with which my invention is shown in cooperation is not of my invention. It is called a transmitter distributor and is a motor-driven device which translates code combinations, perforated in a paper tape, into electrical impulses and transmits these impulses to one or more receiving stations. The tape may be perforated by any one of several models of teletypewriter perforating or reperforating machines.

There are two kinds of transmitter distributors; one for transmitting five unit code, and the other for transmitting six unit code. These two kinds are identical except that the six unit code machine accommodates a wider tape and provides for the transmission of an additional impulse.

Turning now to the drawings, the tape A is shown as fed by feed wheel 1 acting through punch holes 2 longitudinally and centrally punched in the initially blank tape. Protecting cover 3 is hinged at 4 and releasably locked in the machine by a pivoted device shown at 5. Pivoted at 6 are a series of levers 7, there being six of these levers in a six unit code device each carrying tape pins 8 adapted to pass up to the tape A and through the tape A as shown in the case of the three pins at the right of Figure 2, if there are punches in the tape permitting such passage of the tape pins. There being no punches in the tape at the left of Figure 2, the three pins thereunder are held in the lower position as shown and signals are transmitted to the receiving end showing that the tape is punched at the three holes through which the tape pins have passed.

As shown in Figure 2, there are mounted below the levers 7 a cross member 9 extending diagonally across the line of levers and carrying two downwardly extending pins 10 passing through the switch boxes 11. The left hand pin 10 is shown adapted to bear upon the end of the spring member 12, carrying a contact piece 13 in this instance shown as carried away from the associated contact piece 14 thereby breaking the circuit as shown in Figure 4 constituting a short circuit B across the main line circuit C to the transmitter distributor, not shown. The other pin 10 contacts the end of a similar spring member 15 carrying a contact piece 16 associating with the upper contact piece 17.

Figure 6:
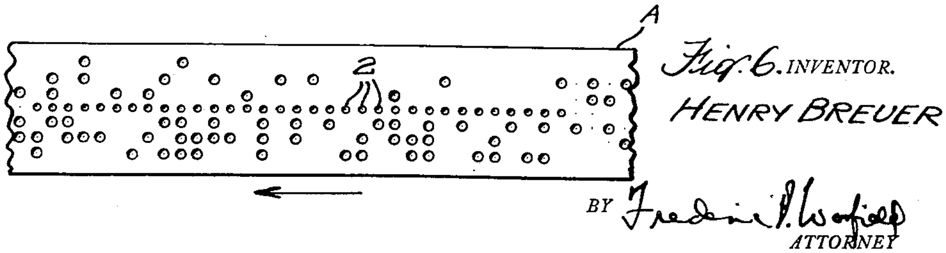
Figure 6 shows the same tape with the rub-out section eliminated by the action of my invention, as such tape would be received at the receiving end, ready to go to the line casting machine without the necessity for any action to eliminate the rub-out section if the tape as shown in Figure 5 had been transmitted without the elimination of this rub-out section.
Figure 7:
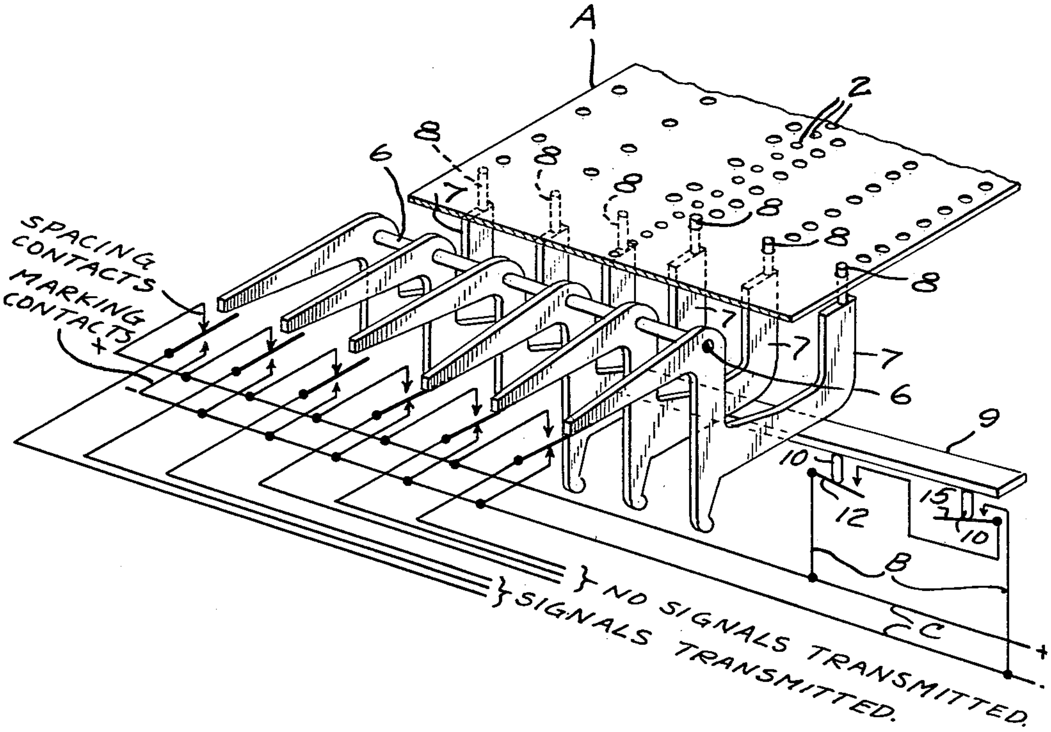
Figure 7 shows on an enlarged scale in top plan the part shown in Figure 2 with the circuit connections of Figure 4 thereby providing a complete view of the mode of operation of the invention.

As shown in Figure 4, all of the tape pins 8 have passed up through the six holes in the tape A because of the fact that a rub-out section is indicated on the tape and the short circuit B is established, and because the main line circuit C, which is a transmission line for transmission of signals to a transmitter distributor, is short-circuited, no line signals will be transmitted. This condition continues so long as the rub-out section of the tape is indicated by the six punch holes. When the rub-out section is passed, the short circuit B is broken as indicated in Figure 2, the line circuit C is re-established, and signals will continue to go forward from the point where the rub-out section began, as indicated in the tape of Figure 6.

Figure 4 shows diagrammatically spacing screws and marking screws connected to the two branches of the main line with a switch lever, in each case shown as down, adapted to be drawn up to the spacing screw above to complete the circuit for the proper signal indicated by the code punch on the tape.

I have thus provided a simple and efficient means of cooperating with the transmitter distributor in accordance with which the rub-out section indicated by the tape, as originally prepared, may be eliminated from the signals transmitted to the receiving end, and tape transmitted without necessity for any consideration of errors or correction for errors at the receiving end. This results in a very important saving of expense and of time, which is of special importance in a printing office and in the operation of the line casting or other machines with which such tapes may be efficiently used.

Since certain changes may be made in the above construction and different embodiments of the invention could be made without departing from the scope thereof, it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which as a matter of language might be said to fall therebetween.

I claim:

1. In a tape transmitter of the class described, in combination with levers carrying tape pins adapted to pass through code holes in the prepared tape, a main line transmission circuit to a transmitter distributor, a short circuit across said main line, a switch adapted to hold said short circuit open, and means rendering said switch operative to short circuit the main line upon the passage of said tape pins through a line of transverse code holes in the tape indicating a rub-out section.

2. In a tape transmitter of the class described, in combination with pivoted levers carrying tape pins adapted to pass through code holes in the prepared tape, a switch box located below the pivoted levers, a transmission line, said switch box carrying a spring-pressed contact piece interposed in a short circuit across the transmission line, a part adapted to bear upon said spring-pressed contact piece, a second part carrying said first part bearing against said tape pin levers and controlling the position of said first part to permit the making and breaking of said short circuit.

References Cited in the file of this patent

UNITED STATES PATENTS

| | | |
|---|---|---|
| 1,863,479 | Hoover et al. | June 14, 1932 |
| 2,477,309 | Maxwell | July 26, 1949 |
| 2,708,216 | Doerrfeld | May 10, 1955 |